US005502280A

United States Patent [19]
Rocci et al.

[11] Patent Number: 5,502,280
[45] Date of Patent: Mar. 26, 1996

[54] CABLE SPLICE PROTECTOR

[75] Inventors: Joseph Rocci, Burr Ridge; David W. Kirby, Lemont, both of Ill.

[73] Assignee: Etcon Corporation, Burr Ridge, Ill.

[21] Appl. No.: 335,111

[22] Filed: Nov. 7, 1994

Related U.S. Application Data

[63] Continuation of Ser. No. 100,672, Jul. 30, 1993, abandoned.

[51] Int. Cl.⁶ .......................... H01R 4/00; H01R 13/52
[52] U.S. Cl. .................... 174/84 R; 174/845; 174/91; 439/271; 439/274; 439/275
[58] Field of Search ...................... 174/84 S, 84 R, 174/88 R, 91, 92, 93; 439/271, 274, 275

[56] References Cited

U.S. PATENT DOCUMENTS

| | | |
|---|---|---|
| 242,388 | 5/1881 | Smith . |
| 297,927 | 4/1884 | Goebel . |
| 457,865 | 8/1891 | Manson . |
| 706,567 | 8/1902 | Jones . |
| 707,055 | 8/1902 | Earl . |
| 743,346 | 11/1903 | Swain . |
| 862,618 | 8/1907 | Dossert . |
| 1,167,962 | 1/1916 | Wilson . |
| 1,656,912 | 1/1928 | Foster . |
| 1,688640 | 10/1928 | Levin . |
| 1,718,817 | 5/1929 | Greene . |
| 1,975,244 | 10/1934 | Wiseman . |
| 2,001,131 | 5/1935 | Guhl . |
| 2,239,026 | 4/1941 | Wagner . |
| 2,478,082 | 8/1949 | Broske ................... 174/84 R |
| 3,041,575 | 6/1962 | Schneider . |
| 3,187,088 | 6/1965 | Warner .................... 174/88 R |
| 3,290,064 | 12/1966 | Bush ........................ 174/92 |
| 3,381,082 | 4/1968 | Peterson . |
| 3,573,346 | 4/1971 | Appelby . |
| 3,854,003 | 12/1974 | Duret . |
| 4,029,895 | 6/1977 | Scarborough ............ 174/84 R |
| 4,192,964 | 3/1980 | Sacks ....................... 174/88 R |
| 4,484,022 | 11/1984 | Eilentropp .............. 174/84 R |
| 4,684,764 | 8/1987 | Luzzi et al. . |

FOREIGN PATENT DOCUMENTS

| | | | |
|---|---|---|---|
| 0138700 | 4/1985 | European Pat. Off. ........... 439/730 |
| 1278132 | 10/1960 | France ................. 174/91 |
| 1490745 | 6/1966 | France ................. 174/93 |
| 3329904 | 3/1985 | Germany ............... 174/91 |
| 4259767 | 9/1982 | Japan ................... 439/271 |
| 3198615 | 8/1991 | Japan ................... 174/93 |

*Primary Examiner*—Leo P. Picard
*Assistant Examiner*—Stephen T. Ryan
*Attorney, Agent, or Firm*—Banner & Allegretti, Ltd.

[57] ABSTRACT

A cable splice protector for protecting one or more cable splices located in an inner recess defined by the combination of a first inner shell and a second inner shell, an outer recess for containing the two inner shells including a first outer shell and second outer shell, the cable splice being compressively sealed from the element where the spliced cables pass through apertured grommets associated with the first and second inner shells.

26 Claims, 4 Drawing Sheets

CABLE SPLICE PROTECTOR

This application is a continuation of application Ser. No. 08/100,672, filed Jul. 30, 1993 now abandoned.

BACKGROUND OF THE INVENTION

1. Field of the Invention

This invention concerns a reusable apparatus for protecting a cable splice from the elements, and especially for protecting cable splices that are to be buried. This invention is also a method for protecting a spliced cable with the apparatus of this invention.

The cable splice protector of this invention is easily associated with separate ends of a cable or cables to be spliced. When the ends of the cable or cables are spliced, the apparatus of this invention is associated with the cable splice in a manner that protects the splice site from moisture, dirt, and other contaminants.

2. Description of the Art

Kits for protecting cable splices are well known in the prior art. One form of cable splice protector kit uses shrink-wrap. The shrink-wrap kit typically include a connector for uniting two ends of a cable, a cylindrical rubber piece that surrounds the connector, and a cylindrical piece of shrink wrap that is applied to the rubber covered connector to seal the splice from the elements. Such shrink-wrap based cable splice protector kits require a heat source in order to apply the shrink wrap. In addition, the protective sheath formed by the shrink wrap is not reusable.

A transition sealing device is available in the prior art that is able to seal a cable transition through a wall or a panel. The cable transition sealing device includes a shell having a threaded end complementary to a wall or panel, and end having a collet. A sealing nut is complementary to the collet. The union of the sealing nut and the collet compresses and seals a cable passing through the fitting.

U.S. Pat. No. 4,684,764 to Luzzi et al., describes a two piece locking housing for protecting a high voltage cable splice. The locking housing uses rolled end seals to prevent dirt and moisture from entering the housing.

U.S. Pat. No. 3,854,003 to Duret describes a connector for joining two ends of a co-axial cable. The connector uses an annular wedge combined with a shell to mechanically clamp and secure the cable. The connector does not include any type of seal to protect the connection from dirt and moisture.

U.S. Pat. No. 3,573,346 to Appleby discloses a strain relief coupling. The strain relief coupling includes an ellipsoidal member that is made up of armor rods overlying an inner shell. The cable is surrounded by the ellipsoidal member which, when united with the coupling housing transfers all strain from the cable to the housing.

U.S. Pat. No. 3,381,082 to Peterson describes a cable splicer. The cable splicer described includes a plastic like substance that encases a striped, end portion of a cable. A compressive force is applied to the plastic like substance to produce a tight, gas proof seal.

U.S. Pat. No. 2,239,026 to Wagner describes a cable connector including two insulated members that are united with a threaded cylindrical member.

U.S. Pat. No. 2,001,131 to Guhl describes a connector that is associated with a cable without solder. The connector includes to female members that are united with a single male member to form a connector housing.

U.S. Pat. No. 1,718,817 to Greene describes a cable connector. The cable is sealed into the cable connector by a single compression point. A wedge-ring is inserted into the end of the insulated wire and a compression ring, acting in concert with a collar, secures the cable into place.

U.S. Pat. No. 1,656,912 to Foster, U.S. Pat. No. 1,167,962 to Wilson, U.S. Pat. No. 862,618 to Dossert, U.S. Pat. No. 707,055 to Earl, U.S. Pat. No. 706,567 to Jones, U.S. Pat. No. 297,927 to Goebel, and U.S. Pat. No. 242,388 to Smith each describe cable splice connectors.

SUMMARY OF THE INVENTION

It is an object of this invention to provide a cable splice protector that is assembled without the use of heat.

It is another object of this invention to provide a cable splice protector that is reusable.

It is still another object of this invention to provide a cable splice protector that is able to protect the splice site of many different types of cables from moisture and dirt.

It is yet another object of this invention to provide a cable splice protector that is sealed by compression at two or more points.

It is still another embodiment of this invention to provide a cable splice protector that is able to simultaneously protect more than one cable splice site.

In one embodiment, this invention is a cable splice protector comprising a hollow first inner shell, a hollow second inner shell, a hollow first outer shell, and a hollow second outer shell. The hollow first inner shell includes first inner shell body having a first open end and an opposing second open end. The second open end has a smaller cross-sectional area than the first open end and includes an apertured grommet surrounded by a compressible wall. The first open end includes a seal. The cable splice protector also includes a hollow second inner shell having a first open end and an opposing second open end. The second open end has a smaller cross-sectional area than the first open end and includes a compressible wall surrounding a compressible grommet. The cable splice protector also includes a hollow first outer shell having a recess large enough to contain the hollow first inner shell. The first outer shell has a first open end and a second open end. The second open end has a smaller cross-sectional area than the first open end and includes an inwardly tapered shoulder. The first open end of the first outer shell includes a variable connector. The cable splice protector includes a second outer shell with a recess large enough to encompass the hollow second inner shell. The second outer shell has a first open end and a second open end having a smaller cross-sectional area than the first open end and including an inwardly tapered shoulder. Finally, the second outer shell includes a second variable connector complementary to the first variable connector.

In another embodiment, this invention is a method of protecting at least one cable splice with a cable splice protector. The cable splice protector useful in this invention includes a first inner shell having a first open end and an opposing second open end having a smaller cross sectional area than the first open end. The second open end consists of a compressible wall surrounding an apertured grommet located inside the compressible wall. The cable splice protector includes a second inner shell having a first open end and an opposing second open end having a smaller cross sectional area than the first open end. The cable splice protector further includes a first outer shell and a second outer shell each having a recess large enough to contain the first inner shell and a second inner shell respectively. Both the first outer shell and the second outer shell have a first open end and a second open end having a smaller cross sectional area than the first open end and both include an inwardly tapered shoulder associated with the second open end. Finally, the first outer shell and the second outer shell have complimentary variable connectors. One method of this invention uses a first cable shield sub-assembly and a second cable shield sub-assembly to protect a cable splice. The first cable shield sub-assembly comprises an apertured grommet associated with the inner dimension of the compressible wall of the first inner shell which in turn is located in the recess defined by the first outer shell. The second cable shield sub-assembly comprises an apertured grommet located in the inner dimension of the compressible wall of the second inner shell. The second inner shell, in turn, is located in the second outer shell. The first cable shield sub-assembly and the second cable shield sub-assembly are then associated with an end of a first cable and an end of a second cable respectively. The end of the first and second cables are associated with the first and second cable shield sub-assemblies such that the ends of first and second the cables pass through the second end of the outer shell, the second end of the inner shell, and then pass through an aperture in aperture grommet of the first and second cable shield sub-assemblies. Finally, the end of the cable is passed out of the first opening of the inner shell and out of the first opening of the outer shell. At this point, at least one cable splice is made. Finally, the first and second cable shield sub-assemblies are compressively united using the variable connector to seal the splice site from water and other contaminants.

In another method, a cable splice is protected from water and other contaminants using the cable splice protector of this invention by uniting the various pans of the cable splice protector with an end of a first or second cable as the cable splice protector is being assembled. According to the method of this invention, an end of a first cable to be spliced is directed through the second end of a first outer shell, through an aperture associated with an apertured grommet, and through the second end of a first inner shell. Next, an end of a second cable is passed through the second end of a second outer shell, through an aperture associated with an apertured grommet and finally through the second end of a second inner shell. At this point, the ends of the first and second cables may be spliced or, alternatively, the first and second cable splice sub-assembly may be assembled around the first and second cables before the cables are spliced. The first cable splice sub-assembly is assembled by locating the apertured grommet inside a compressible wall associated with the first inner shell and thereafter locating the first inner shell and the recess defined by the first outer shell. The second cable splice sub-assembly is directed in the same manner. Finally, the first cable splice sub-assembly is compressively associated with the second cable splice sub-assembly using the variable connector associated with each cable splice sub-assembly.

DESCRIPTION OF THE DRAWINGS

There is shown in the drawings a presently preferred embodiment of the cable splice protector of this invention wherein like numerals in the various Figures pertain to like elements and wherein.

DESCRIPTION OF THE CURRENT EMBODIMENT

The present invention is a cable splice protector that is assembled around one or more cable splice sites. The cable splice protector compressively isolates each cable splice site from moisture and dirt.

Various elements of the cable splice protector of this invention are shown in FIGS. 1–9. Referring now to those Figures, the cable splice protector of this invention comprises a first inner shell 10, a second inner shell 20, a first outer shell 30, and a second outer shell 40. First inner shell 10 and second inner shell 20 unite to enclose one or more cable splice. First outer shell 30 and second outer shell 40 unite to form a recess that covers first and second inner shells 10 and 20 and that compressively isolates each cable splice from dirt and moisture.

Figure 2A:
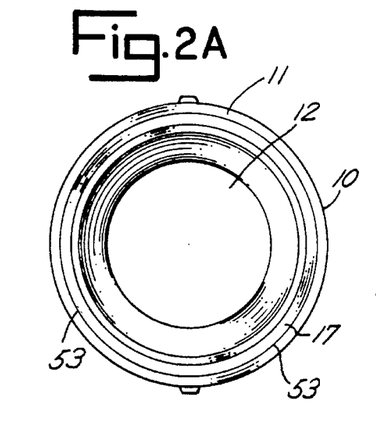
FIGS. 2A, 2B, and 2C are first end, side cutaway, and second end views respectively of a first inner shell of a cable splice protector of this invention.
Figure 2B:
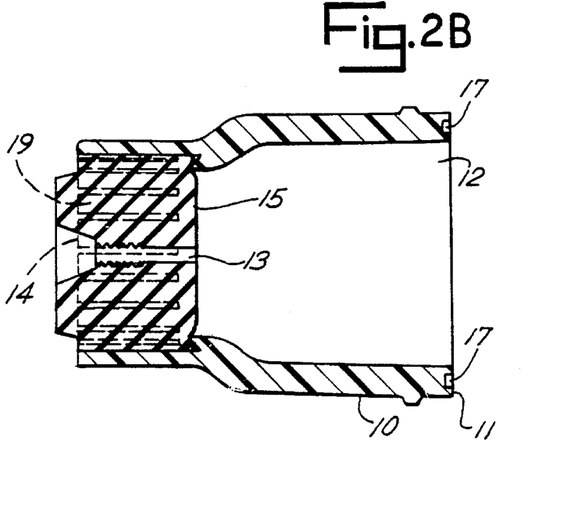
Figure 2C:
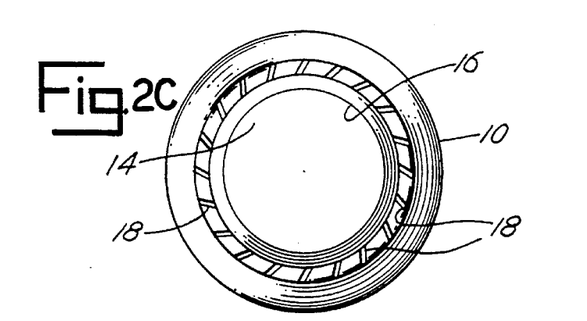

Referring now to FIG. 2A, 2B and 2C, first inner shell 10 is preferably cylindrical in shape and has a first open end 12 and a second open end 14. Second open end 14 will generally have a smaller cross-sectional area than first open end 12. First inner shell 10 also includes a compressible wall 19. Compressible wall 19 forms second open end 14 of first inner shell 10. Compressible wall 19 may be any type of structure that is capable of being radially compressed. Examples of compressible walls include a radially corrugated wall, an iris type device that operates similarly to a camera aperture, or any other structure that is radially compressible. The preferred compressible wall 19 is made up of a plurality of columns 18. The walls of each column 18 are tapered slightly to allow columns 18 to be uniformly compressed.

First inner shell 10 includes an apertured grommet 15. Apertured grommet 15 is located inside compressible wall 19 of first inner shell 10. It is preferred that first inner shell 10 has a ledge 16 located on the inner dimension of the first inner shell 10 in the area where compressible wall 19 is associated with the non-compressible wall portion of first inner shell 10. Apertured grommet 15 is preferably located in first inner shell 10 such that apertured grommet 15 rests on ledge 16 and extends up to and optionally beyond first open end 12. It is preferred that the diameter of apertured grommet 15 is large enough to slightly distend compressible wall 19 when it is associated with first inner shell 10.

Figures 3A, 3B, 3C, 4A:
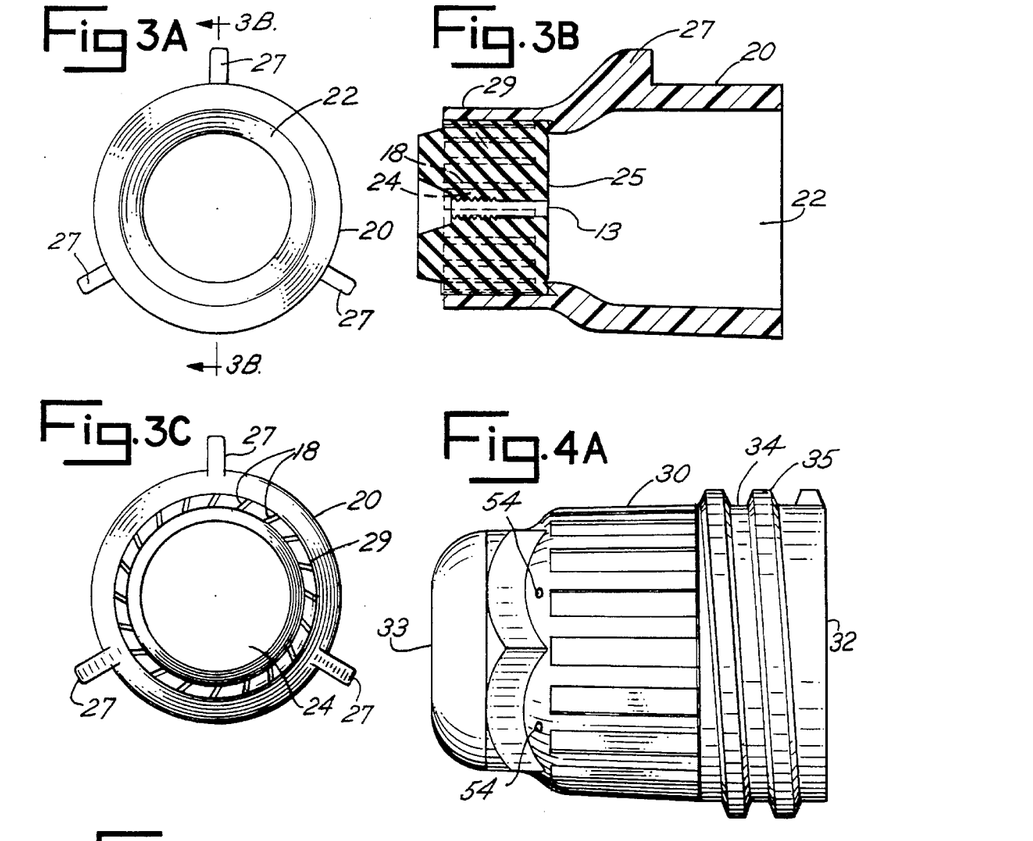
FIGS. 3A, 3B, and 3C are first end, side cutaway, and second end views respectively of a second inner shell of a cable splice protector of this invention.
FIGS. 4A, 4B, and 4C are a side view, first end view, and a side cutaway view of a first outer shell of a cable splice protector of this invention.

Second inner shell 20 is similar in structure to first inner shell 10. Second inner shell 20 is preferably cylindrically shaped and has a first open end 22 and a second open end 24. Second open end 24 will generally have a smaller cross-sectional area than first open end 22. Second inner shell 20 also includes a compressible wall 29. Compressible wall 29 is located adjacent to and forms second open end 24. Compressible wall 29 may be any type of structure that is capable of being radially compressed. Examples of compressible walls include a radially corrugated wall, an iris type device that operates similarly to a camera aperture or any other element that is radially compressible. A preferred compressible wall 29 is made up of a plurality of columns 18. The walls of each column are tapered slightly to allow columns 18 to be compressed.

Second inner shell 20 includes a apertured grommet 25. Apertured grommet 25 is located inside the portion of second inner shell 20 that is defined by compressible wall 29. It is preferred that second inner shell 20 includes a ledge 26 (see FIG. 1). Ledge 26 is located on the inner dimension of second inner shell 26 in the area where compressible wall 29 is associated with a non-compressible wall portion of first inner shell 20. Apertured grommet 25 is associated with second inner shell 20 such that apertured grommet 25 rests on ledge 26 and extends at least up to, and optionally beyond the second open end 24. It is preferred that apertured grommet 25 has a diameter slightly larger than second open end 24 so that compressible wall 29 distends slightly when apertured grommet 25 is associated with second inner shell 20.

First open end 12 and first open end 22 are complementary to one another. The openings may be complementary by virtue of having the same dimension or the openings may include complementary connectors. It is preferred that first open end 12 and first open end 22 have the same dimensions.

First inner shell 10 and second inner shell 20 are sealed where they meet at first open end 12 and first open end 22. The seal can take the form of a gasket, sealing tape such as teflon tape, an adhesive seal, an O-ring, a sealable connector, or any other method known that is capable of sealing a threaded or non-threaded union.

It is preferred that the seal between first inner shell 10 and second inner shell 20 is an O-ring 50. O-ring 50 is located in a recess 17 that passes continuously around the face of either first open end 12 or 22. FIGS. 2A and 2B show recess 17 associated with face 11 of first inner shell 10. Recess 17 should be deep enough to hold O-ring 50, but shallow enough to allow a portion of O-ring 50 to extend above face 11 of first open end 12. It is preferred that recess 17 includes one or more retaining walls 53. Retaining walls 53 hold O-ring 50 in recess 17.

Figure 6A:
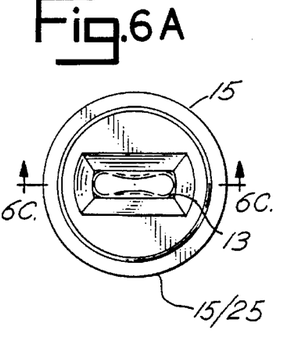
FIGS. 6A, 6B, and 6C are an end view, a side view, and a side cutaway view respectively of an apertured gronmet useful in a cable splice protector of this invention.
Figure 6B:
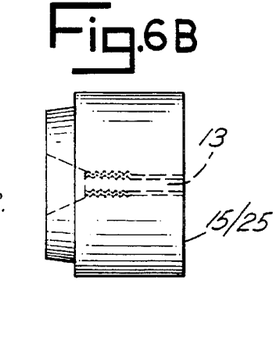

Referring now to FIG. 6A, 6B, 6C and 7, 8 and 9, the apertured grommets 15 and 25 of this invention include one or more apertures that pass entirely through apertured grommet 15 or 25. The number, shape and size of the apertures associated with aperture grommets 15 and 25 will depend upon the number, type, and size of the cables being spliced. It is conceivable that apertured grommet 15 associated with first inner shell 10 will have more apertures or apertures of a different size in comparison to apertured grommet 25 associated with second inner shell 20. As shown in FIGS. 6A, 6B, 7, 8 and 9, the apertures may vary in diameter, in number or, as shown in FIG. 6A, in shape.

Figure 4B:
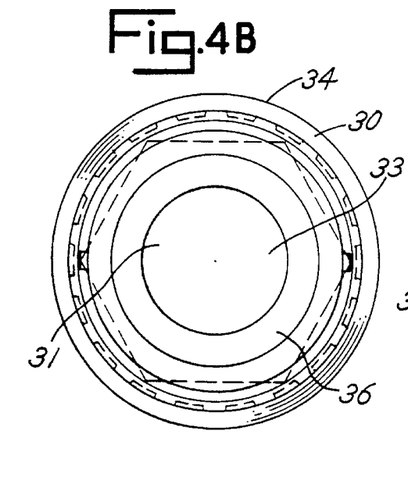
Figure 4C:
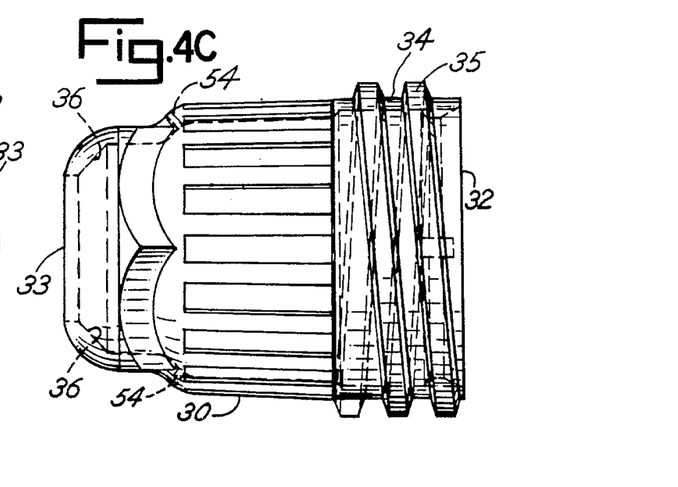

A first connector which could for example be an external thread 35 is associated with first outer shell 30 in the proximity of first open end 32 (see FIG. 4C). First connector 35 is complementary to a second connector thread 45 associated with second outer shell 40. Second open end 33 of shell 30 includes a tapered shoulder 36 (see FIG. 4C) which tapers inwardly towards second open end 33.

The cable splice protector of this invention also includes a second outer shell 40. Second outer shell 40 is similar in construction to first outer shell 30. Second outer shell 40 is preferably cylindrical in shape having first open end 41 (see FIG. 5C) and second open end 43, the combination defining a cavity 42 which is capable of completely containing second inner shell 20. Second open end 43 preferably has a smaller cross-sectional area than first open end 41. Additionally, second open end 43 includes a tapered shoulder 46 which tapers inwardly towards second open end 43.

Second outer shell 40 includes a second connector as for example an internal thread 45. First connector 35 and second connector 46 are complementary and act to draw first outer shell 30 and second outer shell 40 together. Examples of such a connector would include complementary threaded connectors or a ratchet pawl combination. It is preferred that first connector 35 is a threaded connector associated with the outer dimension of first outer shell 30 and second connector 45 is a complementary threaded connector associated with the inner dimension of second outer shell 40.

Second outer shell 40 may include one or more locking slots 48 associated with inner dimension 45 of second outer shell 40. Each locking slot 48 is complementary to a guide arm 27 (see FIG. 3B) associated with the outer dimension of second inner shell 20. It is preferred that second inner shell 20 is centrally located in second outer shell 40. This central location is achieved by locating a guide arm 27 in each locking slot 48. Guide arm 27 controls the distance between second inner shell 20 and second outer shell 40 thereby centrally positioning second inner shell 20 in second outer shell 40.

Figure 1:
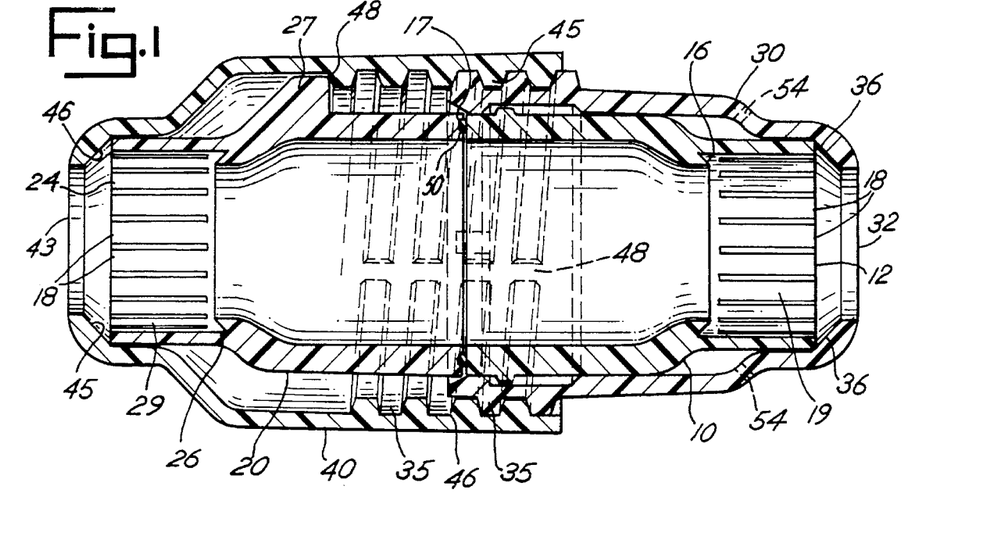
FIG. 1 is a cutaway cross-section view of an assembled cable splice protector of this invention.
Figure 10:
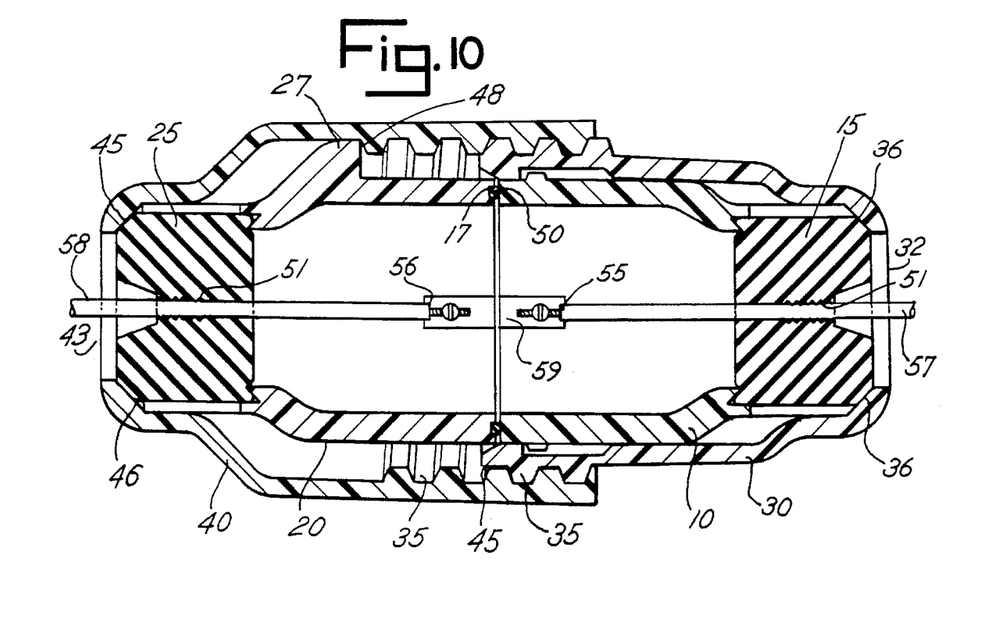
FIG. 10 is a cutaway assembly drawing of a cable splice protector of this invention.

First inner shell 10 is intended to fit into cavity 31 of first outer shell 30 (see FIGS. 1 and 10). First inner shell 10 is preferably centered in first outer shell 30. The centering is preferably achieved by sizing first inner shell 10 so that it can be press fit into cavity 31. The press fitting prevents first inner shell 10 from moving laterally in first outer shell 30.

First inner shell 10, second inner shell 20, first outer shell 30 and second outer shell 40 may be made out of any material that is impervious to moisture and other contaminants. Examples of useful materials include metals, plastics, and ceramics. It is preferred that the various inner and outer shells of this invention are manufactured from a plastic material. Plastic is a cheap, easily machined, yet hard and moisture resistant. The hardness of the material is important to protect the cable splice from being crushed and it provides sufficient compression to seal the cables and the cable splice protector. Essentially, the shells of the cable splice protector should be more rigid than the material used for the grommet and the seal between first inner shell 10 and second inner shell 20. The shells may be made of metals, ceramics, and plastics such as ABS, nylon and polystryene.

The cable splice protector includes a first outer shell 30. First outer shell 30 is preferably cylindrical in shape and includes a first open end 32 and a second open end 33. The combination forms cavity 31 that is capable of completely containing first inner shell 10. First open end 32 preferably has a larger cross-sectional area than second open end 33.

The cable shield protector of this invention is intended to be associated with one or more cable splices. In order to associate the cable splice protector of this invention with a cable splice, the various parts must be associated with at least a first cable end 55 (see FIG. 10) and with a second cable end 56 before the first and second cable ends are spliced. The method for associating the various parts of the cable splice protector with the first and second cable end may vary. For example, in one method, portions of the cable splice protector may be preassembled and then associated with one or more cable ends. Alternatively, the various elements of the cable splice protector may be associated with the two wire ends and then assembled around one or more cable splices.

In one method for protecting a cable splice, apertured grommet 15 is associated with first inner shell 10 so that apertured grommet 15 is located inside compressible wall 19 and abuts ledge 16. Next, first inner shell 10 is centrally located in first outer shell 30. The combination of grommet 15, first inner shell 10, and first outer shell 30 is referred to as the first cable splice sub-assembly.

Next, a second cable splice sub-assembly comprising apertured grommet 25, second inner shell 20 and second outer shell 40 is assembled by pushing apertured grommet 25 inside compressible wall 29 of second inner shell 20 until apertured grommet 25 abuts ledge 26 of second inner shell 20. Second inner shell 20 is then centrally located in cavity 47 of second outer shell 40. Second inner shell 20 is associated with second outer shell 40 so that second open end 24 of second inner shell 20 is complementary to second open end 43 of second outer shell 40. Likewise, first open end 22 of second inner shell 20 is complementary to first open end 32 of first outer shell 30.

In a preferred embodiment, second inner shell 20 includes one or more guide arms 27 complementary to locking slots 48 and second outer shell 40. The combination of the guidearms 27 and locking slots 48 centers second inner shell 20 in second outer shell 40. Also in the preferred embodiment, first inner shell 10 is press fit into cavity 31 of first outer shell 30.

The first cable splice sub-assembly and second cable splice sub-assembly are now associated with end 55 and 56 of a first cable 57 second cable 58 respectively. End 55 of first cable 57 is associated with first cable splice sub-assembly by passing end 55 through an aperture 13 of apertured grommet 15. The end of the first cable is then passed through first grommet 15, through first inner shell 10, and first outer shell 30 and out of first open end 12 of first inner shell 10 and first open end 32 of first outer shell 30. The second cable end is associated with the second cable protector sub-assembly in essentially the same manner.

Ends 55 and 56 of first cable 57 and second cable 58 are now spliced to define splice site 59. Once the two cables are spliced, splice site 59 is protected by uniting first cable protector sub-assembly with second cable protector sub-assembly. This is achieved by moving first cable protector sub-assembly towards second cable protector sub-assembly until first open end 32 and second open 42 are complementary to one another. Finally, first connector 35 of first outer shell 30 is engaged with second connector 46 associated with second outer shell 40 to compressively seal and protect the cable splice.

Uniting the first and second cable splice protector sub-assemblies causes the cable splice to be sealed from dirt and moisture using at least two different compressive seals. As the first and second cable splice protector sub-assemblies are being connected, first open end 12 of first inner shell 10 and first open end 22 of second inner shell 20 abut one another. Continued compression of the first and second cable splice protector sub-assemblies force compressible wall 19 against tapered shoulder 36 of first outer shell 30 and compressible wall 29 against tapered shoulder 45 of second outer shell 40. Compressing compressible walls 19 and 29 against tapered shoulders 36 and 45 causes compressible wall to radially compress against apertured grommets 15 and 25 respectively. In addition, lateral compression caused by connecting the two sub-assemblies forces apertured grommet 15 to seal against ledge 16 and forces apertured gronmet 25 to seal against ledge 26. The radial compression of compressible walls 19 and 29 uniformly compresses apertured grommets 15 and 25 respectively causing the soft grommet material to uniformly compress around the cable or cables being spliced. The lateral and radial compression combine to isolate the cable splice site 57 or splice sites from contaminants.

The cable splice protector includes a third, preferred compressible seal. Preferably, first inner shell 10 includes a recess 17 in which O-ring 50 is located. The recess 17 includes a plurality of O-ring retaining walls 53 which grasp and partially retain O-ring 50 in circular depression 17. When first cable shield sub-assembly is united with the second sub-assembly, first open end 12 of first inner shell 10 abuts second first open end 22 of second inner shell 20. Compression caused by connecting first and second cable shield sub-assemblies causes O-ring 50 to become compressed between first open end 12 and second open end 22 thereby sealing the radial location where first inner shell 10 abuts second inner shell 20.

Figure 5A:
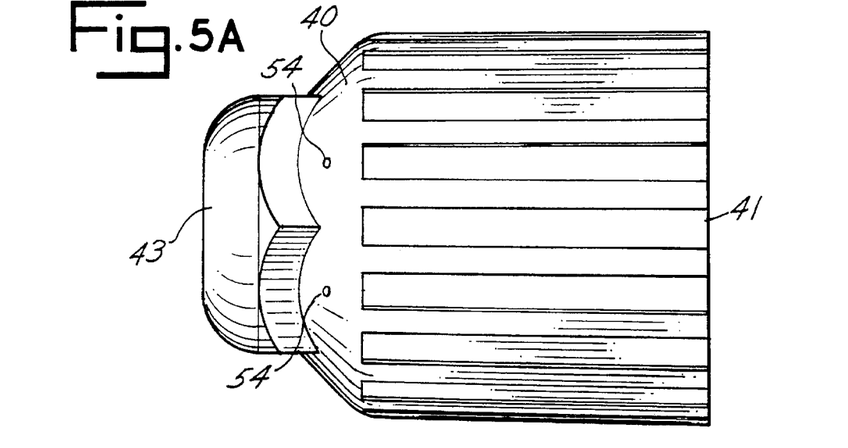
FIGS. 5A, 5B, and 5C are a side view, first end view, and side cutaway view of a second outer shell of a cable splice protector of this invention.
Figure 5B:
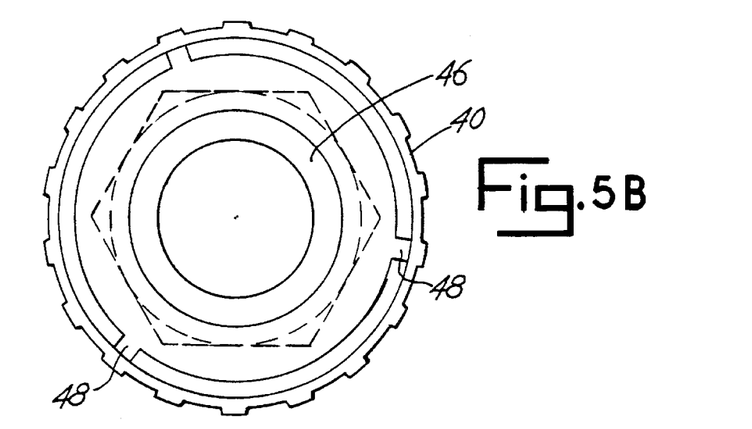
Figure 5C:
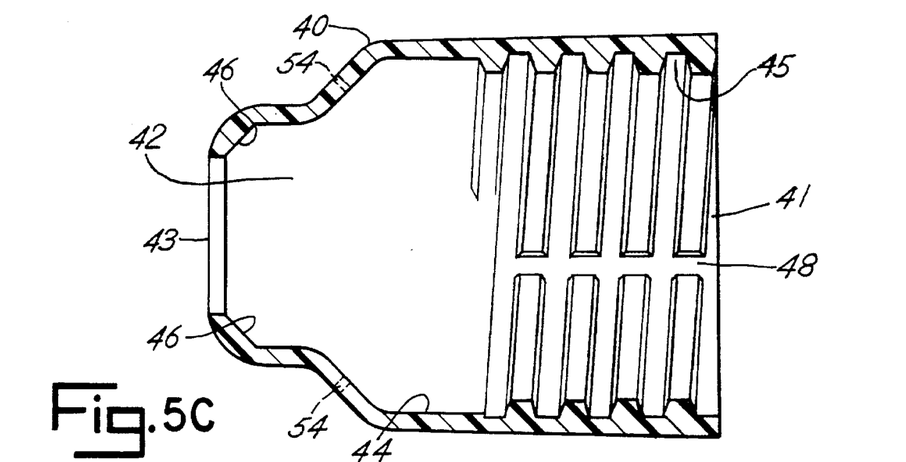

First outer shell 30 and second outer shell 40 preferably include holes 54 (see FIGS. 4A and 5A). Holes 54 allow any water that becomes trapped in the area between the inner shells and the outer shells to drain out of cavities 31 and 42.

Figure 6C:
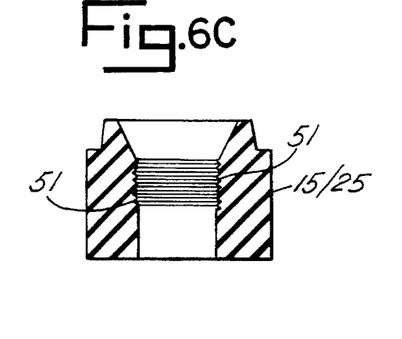
Figure 7:
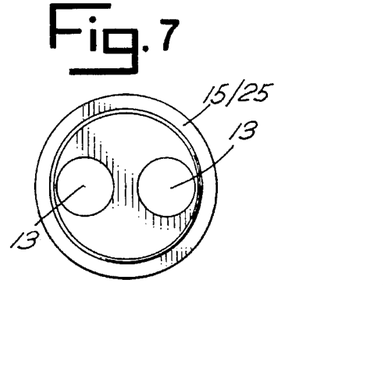
FIGS. 7, 8, and 9 are end views of various apertured grommets useful in association with a cable splice protector of this invention.
Figures 8, 9:
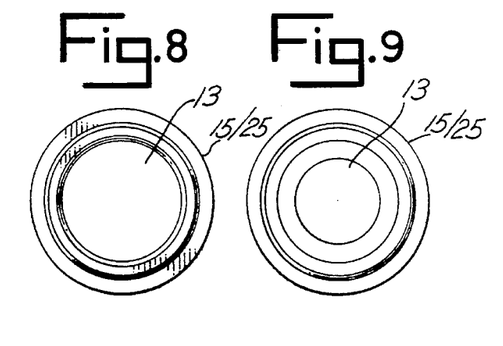

It is preferred that apertures 13 and 23 associated with first grommet 15 and second grommet 25 include one or more scales 51 as shown in FIG. 6C. Each scale 51 acts as a discrete seal around the circumference of any cable that passes through apertured grommet 15 or 25.

The description above has been offered for illustrative purposes only, and it is not intended to limit the scope of the invention of this application which is defined in the following claims.

What I claim is:

1. A cable splice protector comprising:

(a) a first inner shell having a first open end an opposing second open end having a smaller cross-sectional area than the first open end and consisting of a compressible wall;

(b) an apertured gronmet located inside the compressible wall of the first inner shell;

(c) a second inner shell having a first open end complementary to the first open end of the first inner shell, an opposing second open end having a smaller cross-sectional area than the first open end and consisting of a compressible wall;

(d) an apertured grommet located inside the compressible wall of the second inner shell;

(e) a first outer shell having a cavity large enough to contain the first inner shell and having a first open end and an opposing second open end having an inwardly tapered shoulder;

(f) a second outer shell having a cavity large enough to contain the second inner shell, the second outer shell including a first open end, and an opposing second open end having an inwardly tapered shoulder;

(g) a connector for compressively uniting the first outer shell with the second outer shell; and (h) a seal located between the first open end of the first inner shell and the first open end of the second inner shell.

2. The cable splice protector of claim 1 wherein the connector consists of inner diameter threads and complementary outer diameter threads associated with the first and second outer shells.

3. The cable splice protector of claim 1 wherein the connector is a plurality of ratchets and complementary pawls associated with the first and second outer shells.

4. The cable splice protector of claim 1 wherein the seal is an O-ring located in a recess in the first end of the first inner shell.

5. The cable splice protector of claim 4 wherein the recess includes a plurality of O-ring retaining walls.

6. The cable splice protector of claim 1 wherein each aperture of each apertured grommet includes at least one scale.

7. The cable splice protector of claim 1 wherein the first inner shell in press fit into the first outer shell.

8. The cable splice protector of claim 1 wherein the apertured grommets each include a single aperture.

9. The cable splice protector of claim 1 wherein the second inner shell includes at least one guide arm, each guide arm complementary to a locking slot located in the second outer shell recess.

10. The cable splice protector of claim 1 wherein the first and second outer shell each include a plurality of drain holes.

11. A cable splice protector comprising:
(a) a first inner shell having a first open end, a ledge, a compressible wall, and a second open end, the first open end including a recess having a plurality of O-ring retaining walls and containing an O-ring, the second open end having a smaller cross-sectional area than the first open end and including an apertured annular grommet having at least one aperture, each aperture including one or more scales, the grommet abutting the ledge and surrounded by the compressible wall;
(b) a second inner shell having a first open end complementary in shape to the first open end of the first inner shell. A ledge, a compressible wall, at least one guide arm, a second open end having a smaller cross-sectional area than the first open end, the second open end including an apertured grommet having at least one aperture, each aperture including one or more scales, the apertured grommet abutting the ledge and surrounded by the compressible wall;
(c) a first outer shell having a cavity large enough to contain the first inner shell and including a first open end a second open end having an inwardly tapered shoulder and a smaller cross-sectional area than the first open end, and a threaded connector associated with an inner dimension of the first open end; and
(d) a second outer shell having a cavity large enough to contain the second inner shell including at least one locking slot complementary to each guide arm of the second inner shell, a first open end and a second open end having a smaller cross-sectional area than the first open end and an inwardly tapered shoulder, and a threaded connector associated with an outer dimension of the second outer shell.

12. A cable splice protector comprising, in combination, a first inner shell having a first inner end and a first outer end, a second inner shell having a second inner end and a second outer end, said first and second inner shells being assembled with said first and second inner ends in abutting relation, a third outer shell having a third inner end and a third outer end, said third outer shell being mounted over said first inner shell to receive the latter, a fourth outer shell having a fourth inner end and a fourth outer end, said fourth outer shell being mounted over said second inner shell to receive the latter, said third and fourth outer shells being assembled with said third and fourth inner ends fixedly attached to one another to form a substantial enclosure for said first and second inner shells, a first grommet mounted in said first outer end of said first inner shell and having at least one opening for receiving a first cable therethrough, a second grommet mounted in said second outer end of said second inner shell and having at least one opening for receiving a second cable therethrough, whereby said first and second cables may be passed through said inner shells and spliced and thereafter said outer shells may be interconnected, said outer shells physically engaging their respective inner shells in order to locate each inner shell in a corresponding outer shell.

13. A cable splice protector as defined in claim 12 where each of said third and fourth outer ends of said outer shells comprises an opening surrounded by an annular rim which is sized to longitudinally retain a corresponding one of said grommets.

14. A cable splice protector as defined in claim 13 where each of said third and fourth outer ends of said outer shells has an internal tapered portion which is annular and which tapers radially inwardly as it extends longitudinally outwardly toward a corresponding annular rim, each of said tapered portions serving to compress a corresponding one of said first and second outer ends of said inner shells when said outer shells are interconnected.

15. A cable splice protector as defined in claim 14 where said first and second outer ends of said inner shells are longitudinally retained by said tapered portions.

16. A cable splice protector as defined in claim 21 where the smaller one of said outer shells receives a corresponding inner shell in a press fit relation so as to center said corresponding inner shell in said smaller outer shell and where the other of said inner shells has external guides formed thereon to cooperate with the larger of said outer shells to center said other inner shell in said larger outer shell.

17. A cable splice protector comprising, in combination, a first inner shell having a first inner end and a first outer end, a second inner shell having a second inner end and a second outer end, said first and second inner shells being assembled with said first and second inner ends in abutting relation, a third outer shell having a third inner end and a third outer end, said third outer shell being mounted over said first inner shell to receive the latter, a fourth outer shell having a fourth inner end and a fourth outer end, said fourth outer shell being mounted over said second inner shell to receive the latter, said third and fourth outer shells being assembled with said third and fourth inner ends fixedly attached to one another to form a substantial enclosure for said first and second inner shells, a first grommet mounted in said first outer end of said first inner shell and having at least one opening for receiving a first cable therethrough, a second grommet mounted in said second outer end of said second inner shell and having at least one opening for receiving a second cable therethrough, so that said first and second cables may be passed through said inner shells and spliced and thereafter said outer shells may be interconnected, said first outer end of said first inner shell and said second outer end of said second inner shell being radially compressible against said first and second grommets, each of said third and fourth outer ends of said outer shells comprising an opening surrounded by an annular rim which is sized to longitudinally retain a corresponding one of said grommets, each of said third and fourth outer ends of said outer shells having an internal tapered portion which is annular and tapers radially inwardly as it extends longitudinally outwardly toward a corresponding annular rim, each of said tapered portions serving to compress a corresponding one of said first and second outer ends of said inner shells when said outer shells are interconnected, said first and second outer ends of said inner shells being longitudinally retained by said tapered portions, and each of said inner shells being formed with an internal shoulder to longitudinally retain a longitudinally inner end of a corresponding grommet.

18. A cable splice protector as defined in claim 17 where said first grommet extends longitudinally outwardly of said first outer end of said first inner shell and is retained longitudinally by said third outer shell, and said second grommet extends longitudinally outwardly of said second outer end of said second inner shell and is retained longitudinally by said fourth outer shell.

19. A cable splice protector as defined in claim 17 where one of said third and fourth inner ends of said outer shells is dimensioned to fit inside the other of said third and fourth inner ends and said inner ends have complementary threaded portions so one of said third and fourth inner ends may be threaded into the other to interlock said outer shells.

20. A cable splice protector as defined in claim 17 where the smaller one of said outer shells receives a corresponding inner shell in a press fit relation so as to center said corresponding inner shell in said smaller outer shell and where the other of said inner shells has external guides formed thereon to cooperate with the larger of said outer shells to center said other inner shell in said larger outer shell.

21. A cable splice protector as defined in claim 17 where said compressible outer ends of said inner shells each comprises an annular arrangement of spaced longitudinal fingers which are flexible to permit radial compression.

22. A cable splice protector comprising, in combination, a first inner shell having a first inner end and a first outer end, a second inner shell having a second inner end and a second outer end, said first and second inner shells being assembled with said first and second inner ends in abutting relation, a third outer shell having a third inner end and a third outer end, said third outer shell being mounted over said first inner shell to receive the latter, a fourth outer shell having a fourth inner end and a fourth outer end, said fourth outer shell being mounted over said second inner shell to receive the latter, said third and fourth outer shells being assembled with said third and fourth inner ends fixedly attached to one another to form a substantial enclosure for said first and second inner shells, a first grommet mounted in said first outer end of said first inner shell and having at least one opening for receiving a first cable therethrough, a second grommet mounted in said second outer end of said second inner shell and having at least one opening for receiving a second cable therethrough, whereby said first and second cables may be passed through said inner shells and spliced and thereafter said outer shells may be interconnected, said first outer end of said first inner shell and said second outer end of said second inner shell being radially compressible against said first and second grommets.

23. A cable splice protector as defined in claim 22 where said first grommet extends longitudinally outwardly of said first outer end of said first inner shell and is retained longitudinally by said third outer shell, and said second grommet extends longitudinally outwardly of said second outer end of said second inner shell and is retained longitudinally by said fourth outer shell.

24. A cable splice protector as defined in claim 22 where one of said third and fourth inner ends of said outer shells is dimensioned to fit inside the other and said third and fourth inner ends have complementary threaded portions so one of said third and fourth inner ends may be threaded into the other to interlock said outer shells.

25. A cable splice protector as defined in claim 22 where each of inner shells is formed with an internal shoulder to longitudinally retain a longitudinally inner end of a corresponding grommet.

26. A cable splice protector as defined in claim 22 where said compressible outer ends of said inner shells each comprises an annular arrangement of spaced longitudinal fingers which are flexible to permit radial compression.

\* \* \* \* \*